United States Patent Office 3,207,709
Patented Sept. 21, 1965

3,207,709
PREPARATION OF CELLULAR POLYURETHANE PLASTICS
Rudolf Merten, Cologne-Mulheim, and Gerhard Müller and Erwin Windemuth, Leverkusen, Germany, assignors to Farbenfabriken Bayer Aktiengesellschaft, Leverkusen, Germany, a corporation of Germany
No Drawing. Filed Sept. 2, 1959, Ser. No. 837,589
Claims priority, application Germany, Sept. 5, 1958, F 26,556
3 Claims. (Cl. 260—2.5)

This invention relates to polyurethane plastics and a process for the preparation thereof. More particularly, this invention relates to precursors of polyurethane plastics and a process for employing them in the preparation of polyurethane plastics as well as the polyurethane plastics produced thereby.

It has been proposed heretofore to prepare polyurethane plastics from organic compounds containing at least two active hydrogen containing groups which are reactive with an isocyanate group to form a polyurethane plastic. One may produce either substantially non-porous polyurethane plastics under substantially anhydrous conditions by mixing the above-mentioned components and casting them in a mold or by other suitable processes or alternately cellular polyurethane plastics may be produced by incorporating water or other gas generating substances into the reaction mixture.

Hydroxyl polyesters have been widely used as the component containing at least two active hydrogen containing groups. Recently, however, polyhydric polyalkylene ethers have also been employed in the production of polyurethane plastics as the active hydrogen containing compound. The use of polyhydric polyalkylene ethers offers some advantage in the final product produced. Cellular polyurethane plastics based on polyhydric polyalkylene ethers have improved elasticity which makes the resultant cellular polyurethane plastic more useful for many purposes. Elastomeric, substantially non-porous polyurethane plastics based on polyhydric polyalkylene ethers have unusual high strength and good abrasion resistance in addition to improved solvent and ozone resistance over those based on polyesters, however, they suffer from poor low temperature deflection properties.

Owing to the low viscosity of some of the polyhdric polyalkylene ethers such as polypropylene ether glycol and also to the secondary nature of their hydroxyl groups, it is difficult to carry out the foaming raction with water and organic polyisocyanate in a one-step procedure. In an effort to overcome these difficulties in the employment of polyhydric polyalkylene ethers and to obtain the benefit of the use of these compounds as starting materials, it has been proposed heretofore to employ a mixture of hydroxyl polyesters and polyhydric polypropylene ethers in the preparation of cellular polyurethane plastics. This method proved to be unsatisfactory for the preparation of cellular polyurethane plastics because the two components are incompatible and lead to cellular polyurethane plastics containing an irregular pore size which often collapse before setting up to form a cured plastics. It has also been proposed to condense a polyhydric polypropylene ether having a molecular weight of about 2000 with a polycarboxylic acid to produce a polyester, but these products suffered from the same deficiencies as the mixtures of polyesters and polyethers. Experiments in which low molecular weight polyhydric polyalkylene ethers having molecular weights within the range of from about 100 to about 300 were incorporated by condensation during the production of the polyesters lead to components which would not produce a cellular polyurethane plastic due to collapse of the foam at the end of a rise.

Substantialy non-porous polyurethane plastics produced from the above-mentioned mixtures of polyesters and polyhydric polypropylene ethers having a molecular weight of about 2000 or those with a molecular weight within the range of 100 to 300 have poor physical properties.

It is an object of this invention to provide improved polyurethane plastics and processes for the preparation thereof. Another object of this invention is to provide cellular polyurethane plastics having improved elasticity. Still another object of this invention is to provide polyurethane plastics having improved low temperature properties. A further object of this invention is to provide polyurethane plastics which have improved resistance to organic solvents, ozone and hydrolytic degradation. Still another object of this invention is to provide organic compounds suitable for the preparation of improved polyurethane plastics. Another object of the invention is to provide improved precursors of polyurethane plastics which may be converted thereto in a more convenient manner than heretofore possible.

The foregoing objects and others which will become apparent from the following description, are accomplished in accordance with the invention, generally speaking, by providing polyurethane plastics obtained from organic polyisocyanates and hydroxyl polyesters obtained from reactants containing polyhydric polyalkylene ethers having a molecular weight within the range of from about 500 to about 1750. Thus, this invention contemplates both substantially non-porous, cellular polyurethane plastics and precursors thereof obtained from organic polyisocyanates and hydroxyl polyesters which have in turn been obtained from polyhydric polyalkylene ethers having a molecular weight within the range of from about 500 to about 1750 and mixtures of polycarboxylic acids and polyhdric alcohols and/or polyesters containing terminal carboxyl and/or hydroxyl groups.

Any suitable polyester obtained from a polyhydric polyalkylene ether having a molecular weight within the range of from about 500 to about 1750 may be used. It is preferred that the polyester have an acid number below about 15 and an hydroxyl number within the range of from about 15 to about 150 and most preferably within the range of from about 30 to about 80. Sufficient polyether should be employed to lower the viscosity of the polyester to an acceptable level, but excesses should be avoided, as more particularly set forth below, in order to avoid incompatibility with polyester components. Thus, the molecular weight of the polyester may vary over a wide range, but is preferably within the range of from about 1000 to about 20,000.

Any suitable polyhydric polyalkylene ether having a molecular weight within the range of from about 500 to about 1750 may be used, such as, for example, the condensation product of alkylene oxides or of said alkylene oxides with an active hydrogen containing compound. It is preferred to employ polyalkylene ethers having from 2 to 4 hydroxyl groups and polypropylene ether glycols having a molecular weight within the above-defined range are most preferred. Any suitable alkylene oxide may be used for the preparation of the polyhydric polyalkylene ethers, such as, for example, ethylene oxide, propylene oxide, butylene oxide, amylene oxide, styrene oxide and the like. Any suitable active hydrogen containing component may be used, such as, for example, water, alkylene glycols such as ethylene glycol, propylene glycol, 1,4-butylene glycol, glycerine, trimethylol propane, 2-butane 1,4-diol, pentaerythritol, triethanol amine and the like. The reactants used in the preparation of the polyhydric polyalkylene ethers employed in accordance with the present invention may also contain minor amounts of other active hydrogen containing components, such as, for example, ethylene diamine, glucose, epihalohydrins such as epichlorohydrin and the like. The polyhydric polyalkylene ethers may be prepared by any suitable process, for example, the process described by Wurtz in 1859, the process disclosed in Encyclopedia of Chemical Technology, vol. 7, pp. 257–262 published by Interscience Publishers Inc., 1951 and United States Patent 1,922,459.

The polyesters employed in accordance with the invention may be prepared in any suitable manner. Thus, one may react the polyhydric polyalkylene ether having a molecular weight of from about 500 to about 1750 with a mixture of a polycarboxylic acid and a polyhydric alcohol, with a polyester obtained from a polycarboxylic acid and a polyhydric alcohol in a first step and subsequently reacted with the polyether, and/or mixtures of any two or more of the aforementioned components.

Any suitable polycarboxylic acid may be used such as, for example, succinic acid, glutaric acid, adipic acid, pimalic acid, azealic acid, sebacic acid, isosebacic acid, polymerized oleic acid and other fatty acids, phthalic acid, tricarballylic acid, oxyacetic acid, lactic acid and the like.

Any suitable polyhydric alcohol may be used in admixture with said polycarboxylic acid, such as, for example, ethylene glycol, diethylene glycol, propylene glycol, butylene glycol, amylene glycol, glycerine, trimethylol propane, pentaerythritol and the like.

Any suitable polyester may be used for condensation with the above-defined polyhydric polyalkylene ethers.

The polyester may have either terminal hydroxyl groups or terminal carboxyl groups depending on whether an excess of the hydroxyl component or acid component was used in its preparation. The polyester to be reacted with the polyhydric polyalkylene ether preferably has a molecular weight below about 1000. Suitable carboxylic acid terminated polyesters may be obtained for example by the condensation of a polyhydric alcohol such as, for example, ethylene glycol, diethylene glycol, triethylene glycol, propylene glycol, 1,3-butylene glycol, 1,4-butylene glycol, trimethylol propane, glycerine, pentaerythritol and the like with an excess of one or more of the abovementioned polycarboxylic acids.

Suitable hydroxyl terminated polyesters may be obtained from an excess of one of the above-mentioned polyhydric alcohols with one of the above-mentioned polycarboxylic acids.

Any suitable organic polyisocyanate may be used such as, for example, o-phenylene-diisocyanate, m-phenylene-diisocyanate, p-phenylene-diisocyanate, 2,4-toluylene-diisocyanate, 2,6-toluylene-diisocyanate as well as mixtures of these two isomers, 4,4'-diphenylmethane-diisocyanate, benzidine-diisocyanate, 1,5-naphthalene-diisocyanate, hexamethylene-diisocyanate, decamethylene-diisocyanate; also the reaction products comprising isocyanate groups and obtained by reaction of these isocyanates with polyhydric alcohols such as trimethylol propane, butanediols or ethylene glycol; furthermore, the polyisocyanates described in German patent specifications 1,022,789 and 1,027,394. Dimeric diisocyanates are particularly suitable for some embodiments of the invention, such as, for example, the dimer of 2,4-toluylene diisocyanate having the formula:

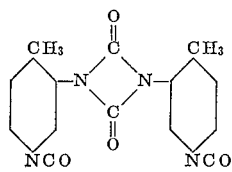

In accordance with the invention, one can produce cellular polyurethane plastics by the reaction of the hydroxyl terminated polyesters more particularly defined above with organic polyisocyanates and water. It is preferred for the purpose of the preparation of cellular polyurethane plastics to employ polyesters of the above-defined type having an acid number below about 15 and which have been prepared from polyhydric polyalkylene ethers having a molecular weight within the defined range.

There is some tendency for the foamability of the hydroxyl polyester to be reduced as the content of the polyhydric polyalkylene ether in the hydroxyl polyester is increased. Also, there is some danger of an increase in the incompatibility of the polyester components. In general, therefore, it is preferred to incorporate not more than up to about 15 equivalent percent of the polyhydric polyalkylene ether into the polyester based on the total alcohol quantity when the polyester is to be used for the production of cellular polyurethane plastics. If the quantity of polyhydric polyalkylene ether incorporated into the hydroxyl polyester is too small, the foam materials will not show any substantial change in their elasticity. Consequently, at least about two equivalents percent of the polyhydric polyalkylene ether based on the total quantity of alcohol employed in the condensation to form an hydroxyl polyester is preferred. "Equivalent," as used above, designates the number of mols times the number of hydroxyl groups and the percentage data relate to the total number of equivalents which are present in the corresponding compound.

It is preferred to carry out the foaming reaction in the presence of a catalyst. Any suitable catalyst may be used such as, for example, dimethyl-benzylamine, dimethylstearylamine peremetyhlated diethylene triamine, permethylated triethylene tetraamine, N-methyl-N'-beta-dimethylaminoethyl-piperazine and generally N,N'-dialkyl-piperazine, N,N'-endoethylene-piperazine, N-alkyl-morpholines, tertiary aminoethers such as 1-alkoxy-3-dialkylaminopropane, and also tertiary amines with esters groups or salts of tertiary amines such as, for example, those mentioned above with more especially organic acids such as oleic acid and benzoic acid.

Emulsifiers may be employed in the reaction of the above-defined polyesters and polyisocyanates with water to form cellular polyurethane plastics. It is preferred to use ricinic or ricimoleic acid-sulphuric acid-esters as well as their salts or also alkylene oxide, such as, ethylene oxide, addition products with hydroxyl compounds, such as, benzylated hydroxy and amino diphenyl. Paraffin oils and/or silicone oils, such as, for example, a linear polydimethyl siloxane having a viscosity of about 50 cps. at 25° C., or siloxane oxyalkylene copolymers may also be added as foam stabilizing substances and in order to regulate the size of the pores.

It is also possible to carry out the foaming reaction by employing an inert blowing agent, either alone or in conjunction with water, such as, for example, dichlorodifluoromethane and others such as are disclosed, for example, in French Patent 1,161,239 to General Tire and Rubber Co., issued August 25, 1958.

The cellular polyurethane plastics produced in accordance with the invention are characterized by substantially improved elasticity and a considerably softer hand by comparison with heretofore known cellular polyurethane plastics. The density of the cellular polyurethane plastics produced in accordance with this invention can be varied by varying the quantity of water and/or organic polyisocyanate. The term "hand" as used above refers to the feel or texture of the cellular polyurethane plastics and is used in the same context as it is used in the textile industry.

In accordance with another embodiment of the invention one may also prepare storage stable intermediates which are suitable for further reaction to prepare both cellular and non-porous polyurethane plastics. Thus, one may react an excess of an organic polyisocyanate with the polyesters obtained from ingredients containing a polyhydric polyalkylene ether having a molecular weight within the range of from about 500 to about 1750 to form an adduct or prepolymer having terminal —NCO groups. The storage stable prepolymer having terminal —NCO groups is preferably prepared under substantially anhydrous conditions so any water in the polyester should be removed prior to reaction with the excess of organic polyisocyanate. The storage stable prepolymer may be stored for long periods of time under substantially anhydrous conditions before it is converted by crosslinking into a cured polyurethane plastic. One of the advantages of employing prepolymers having terminal isocyanate groups is that any heat evolved during the reaction of the organic polyisocyanate with the above-described polyester may be removed before the crosslinking and/or chain-extension reactions. This is especially important if these products are to be employed in the preparation of cellular polyurethane plastic because the temperature of the reaction mixture affects the physical characteristics of the cellular product.

In accordance with another embodiment of the invention, the polyester obtained from ingredients containing a polyhydric polyalkylene ether having a molecular weight within the range of from about 500 to about 1750 are reacted with insufficient organic polyisocyanate to react with all of the terminal reactive groups of said polyester and then reacted with a further quantity of organic polyisocyanate in a second step to bring about chain-extension and cross-linking to produce a polyurethane plastic.

High-grade elastomeric substances are obtained, for example, by reacting polyesters obtained from polyhydric polyalkylene ethers having a molecular weight within the range of from about 500 to about 1750 with an amount of an organic polyisocyanate in excess of that necessary to react with all of the hydroxyl groups of said polyester to prepare a prepolymer having terminal —NCO groups as disclosed above, and then producing crosslinking by adding an alkylene glycol, a diamine, water or the like. It is possible to shape the elastomeric substantially non-porous polyurethane plastic produced in accordance with this embodiment of the invention either immediately or at a later stage. The cross-linkage agent may be mixed with the above-described prepolymer and the liquid reaction mixture poured into a mold and heated until a cross-linked product is obtained by a casting technique such as is disclosed, for example, in United States Patent 2,729,618 to Müller et al., issued January 3, 1956, or alternately one may obtain a crumbly material which may be worked into sheets on a rubber mill or roller and/or pressed into molds. The invention, thus, contemplates not only the production of cellular polyurethane plastics by the process outlined above, but also substantially non-porous polyurethane plastics obtained by either a casting technique or a process where a solid crumbly material is produced which may be further processed and reacted with cross-linking agents, such as, for example, an alkylene glycol, a diamine or water on a rubber mill or if the crumbly component contains terminal groups containing active hydrogen atoms, such as, amino groups and/or hydroxyl groups in the presence of an organic polyisocyanate. Suitable processing conditions and the like for the preparation of substantially non-porous polyurethane plastics by the rubber-milling process may be found in United States Patent 2,621,166 to Schmidt et al., issued December 9, 1952.

Any suitable cross-linking agent may be used in the foregoing processes for the production of substantially non-porous polyurethane plastics. Water and polyfunctional organic compounds are preferred for this purpose. Suitable polyfunctional organic compounds include, for example, polyhydric alcohols, such as, for example, ethylene glycol, propylene glycol, 1,4-butylene glycol, trimethylol propane, pentaerythritol, p-phenylene bis-($\beta$-hydroxy ethyl ether) and the like, and polyamines, such as, for example, ethylene diamine, propylene diamine, p-amino aniliene and the like.

The polyurethane plastics of the present invention have many uses. Thus, the cellular polyurethane plastics of the invention may be used as seat cushions, topper pads for seat cushions as used in the automotive industry, as both thermal and sound insulation in the building industry, for the production of toys and ornaments, as well as a host of other applications. The substantially homogeneous or non-porous polyurethane plastics of the invention may be used to advantage in many of the applications heretofore employing rubber as well as in many applications where rubber was unsatisfactory. Thus, the substantially non-porous polyurethane plastics may be used in the production of O-rings, accumulation bladders, bearing surfaces, pipe, shoe soles and the like.

The invention is further illustrated by the following examples in which the parts are by weight unless otherwise noted:

EXAMPLE 1

*Preparation of polyester A*

A mixture of about 6.1 parts of diethylene glycol, about 6.0 parts of polypropylene glycol with a mean molecular weight of about 1200 and about 0.67 part of trimethylol propane is heated to about 70°–80° C. About 8.78 parts of adipic acid are then added. As soon as the adipic acid has melted and dissolved, approximately 0.00155 part of titanic acid-tetra-n-butyl-ester is added. The water formed in the esterification is now distilled off while inert gas is conducted over and through the mixture, the temperature being slowly raised to about 200° C. in proportion as the distillation proceeds. As soon as the temperature on the transition thermometer falls below about 80° C., a vacuum is applied and the pressure is slowly lowered to about 10 to about 15 mm. Hg. The acid number of the ester constantly decreases and is about 2.0 after about 5 to 10 hours at about 200° C./15 to 20 mm. Hg. At this time, the esterification is stopped; as distillate, there are obtained altogether about 2.1 to about 2.3 parts of water. The ester which is obtained has an OH number of about 50.5, an acid number of about 2.0 and a viscosity of about 10080 cp./25° C.

EXAMPLE 2

*Preparation of polyester B*

About 1775 parts of a dimerized and trimerized unsaturated fatty acid (acid number about 189.3; iodine number about 20.0; about 0.19% of $H_2O$), about 5400 parts of the polypropylene glycol ether described above, about 606 parts of trimethylol propane and about 6050 parts of diethylene glycol are heated to about 60 to about 80° C., about 7900 parts of adipic acid are added and approximately 1.55 parts of titanic acid tetra-n-butyl ester are introduced after the adipic acid has melted and dissolved. Esterification is carried out as described for polyester A and an acid number below about 2.0 is obtained after about 4 to about 5 hours at about 200° C./15 to 20 mm. Hg. As distillate, a total of about 2100 parts of water are obtained. The polyester has an OH number of about 57.8, an acid number of about 0.2 and a viscosity of about 8900 cp./25° C.

EXAMPLE 3

About 100 parts by volume of the polyester A from Example 1, about 41.4 parts by volume of a technical toluylene diisocyanate mixture containing the 2,4- and 2,6-isomers in the ratio of about 65:35, and about 8.2 parts by volume of a water-emulsifier-catalyst mixture which consists of about 1.2 parts by volume of dimethyl benzylamine, about 2.5 parts by volume of a 50% aqueous solution of an adduct of about 10–12 mols of ethylene oxide on benzylated hydroxydiphenyl, about 1.5 parts by volume of a 50% aqueous solution of sulphonated ricinic acid, about 1.5 parts by volume of a 50% aqueous Turkey red oil solution, about 1 part by volume of an aqueous 0.0033% ammonium molybdate solution and about 0.5 part by volume of paraffin oil, are intimately mixed mechanically in a mixer such as is disclosed in United States Reissue Patent 24,514 to Hoppe et al., issued August 12, 1958. A soft foam material is obtained which sets in about 5 to 10 minutes and has the following physical properties:

| | |
|---|---|
| Bulk density _____kg./m.$^3$__ | 32 |
| Elasticity, percent _____ | 36 |
| Tensile strength _____kg./cm.$^2$__ | 1.15 |
| Breaking elongation, percent _____ | 300 |
| Impact hardness _____g./cm.$^2$__ | $^1$ 43 |
| Permanent deformation, percent _____ | 18 |

$^1$ At 40%.

A corresponding foam of a polyester prepared without polypropylene glycol ether has the following values:

| | |
|---|---|
| Bulk density _____kg./m.$^3$__ | 30–35 |
| Elasticity, percent _____ | 25 |
| Tensile strength _____kg./cm.$^2$__ | 1.20 |
| Breaking elongation, percent _____ | 180–200 |
| Impact hardness _____g./cm.$^2$__ | $^1$ 55 |
| Permanent deformation, percent _____ | 10 |

$^1$ At 40%.

EXAMPLE 4

About 100 parts by volume of the initial polyester B, from Example 2, about 37.2 parts by volume of the tolylene-diisocyanate mixture according to Example 3 and about 8 parts by volume of an activator-water-emulsifier mixture consisting of about 2 parts by volume of dimethyl benzylamine, about 2 parts by volume of a 50% aqueous Turkey red oil solution, about 2.5 parts by volume of water, about 0.5 part by volume of paraffin oil and about 1 part by volume of an approximately 1:1 mixture of oleic acid polyethylene glycol ester and dodecyl phenyl ammonium sulphonate are intimately mixed and yield a soft foam material which sets after about 8 to 10 minutes and has the following physical properties:

| | |
|---|---|
| Bulk density _____kg./m.$^3$__ | 38 |
| Elasticity, percent _____ | 36 |
| Tensile strength _____kg./cm.$^2$__ | 1.11 |
| Breaking elongation, percent _____ | 230 |
| Impact hardness _____g./cm.$^2$___ | $^1$ 49 |
| Permanent deformation, percent _____ | 11 |

$^1$ At 40%.

EXAMPLE 5

About 1120 parts of the initial polyester A from Example 1 is mixed with about 400 parts of 4,4'-diphenyl methane diisocyanate at a temperature of about 125° C. to prepare an isocyanate-modified polyester having about 6.5 percent —NCO available for further reaction. To this isocyanate-modified polyester is added about 9 parts by weight of 1,4-butane diol with stirring and the mixture is cast in a mold and cured by heating to a temperature of about 110° C. for about 24 hours. The resulting substantially non-porous polyurethane plastic obtained exhibits the normal abrasion resistance, ozone resistance and resistance to hydrocarbons of polyurethane plastics and moreover retains its flexibility at low temperatures down to about —60° C.

EXAMPLE 6

About 980 parts of the initial polyester B from Example 2 is mixed wth about 400 parts of 4,4'-diphenyl-methane diisocyanate at a temperature of about 125° C. to prepare an isocyanate-modified polyester having about 6.5 percent —NCO available for further reaction. To this isocyanate-modified polyester is added about 90 parts of 1,4-butane diol with stirring and the mixture is cast in a mold and cured by heating to a temperature of about 110° C. for about 24 hours. The resulting substantially non-porous polyurethane plastic obtained exhibits the normal abrasion resistance, ozone resistance and resistance to hydrocarbons of polyurethane plastics and moreover retains its flexibility at low temperatures down to about —60° C.

EXAMPLE 7

About 1120 parts of the initial polyester A from Example 1 is mixed with about 120 parts of 4,4'-diphenyl-methane diioscyanate to obtain an isocyanate-modified polyester. The isocyanate-modified polyester is a crumbly mass which is mixed on a rubber mill with about 6 parts of the dimer of 2,4-toluylene diisocyanate per 100 parts of the isocyanate-modified polyester and compounded until a substantially homogeneous mixture is obtained. The resulting elastomer is then removed from the rubber mill and pressed and cured at about 130° C. for about 30 minutes. The resulting substantially non-porous polyurethane plastic obtained exhibits the normal abrasion resistance, ozone resistance and resistance to hydrocarbons of polyurethane plastics and moreover retains its flexibility at low temperatures down to about —60° C.

EXAMPLE 8

About 980 parts of the initial polyester B obtained from Example 2 is mixed with about 120 parts of 4,4'-diphenylmethane diisocyanate to obtain an isocyanate-modified polyester. The isocyanate-modified polyester is a crumbly mass which is mixed on a rubber mill with about 6 parts of the dimer of 2,4-toluylene diisocyanate per 100 parts of the isocyanate-modified polyester and compounded until a substantially homogeneous mixture is obtained. The resulting elastomer is then removed from the rubber mill and pressed and cured at about 130° C. for about 30 minutes. The resulting substantially non-porous polyurethane plastic obtained exhibits the normal abrasion resistance, ozone resistance and resistance of hydrocarbons of polyurethane plastics and moreover retains its flexibility at low temperatures down to about 60° C.

It is to be understood that any of the other polyesters prepared from reactants containing polyhydric polyalkylene ethers having a molecular weight within the range of from about 500 to about 1750 described herein can be substituted for the ones used in the preceding examples with equally satisfactory results. Moreover, any other suitable organic polyisocyanate, foam stabilizer or other component may be substituted for any one of those specified in the examples.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A process for the production of a cellular polyurethane which comprises simultaneously mixing an organic polyisocyanate with a polyester having terminal hydroxyl groups in the presence of a foaming agent, said polyester prepared by reacting an excess of a polyhydric alcohol with a polycarboxylic acid, said polyhydric alcohol comprising from about 2 equivalent percent to about 15 equivalent percent polypropylene ether glycol based on the total alcohol quantity of said polyester, said polypropylene ether glycol having a molecular weight of from about 500 to about 1750.

2. The process of claim 1 wherein an excess of said organic polyisocyanate is reacted with said polyester.

3. The process of claim 1 wherein said polycarboxylic acid is adipic acid.

(References on following page)

References Cited by the Examiner

UNITED STATES PATENTS

| | | | |
|---|---|---|---|
| 2,275,494 | 3/42 | Bennett | 260—75 |
| 2,744,087 | 5/56 | Snyder | 260—75 |
| 2,779,689 | 1/57 | Reis | 260—75 |
| 2,866,774 | 12/58 | Price | 260—75 |
| 2,894,919 | 7/59 | Simon et al. | 260—75 |
| 3,079,350 | 2/63 | Bernstein | 260—2.5 |

FOREIGN PATENTS

| | | |
|---|---|---|
| 682,866 | 11/52 | Great Britain. |
| 773,897 | 5/57 | Great Britain. |
| 929,507 | 6/55 | Germany. |

LEON J. BERCOVITZ, *Primary Examiner.*

MILTON STERMAN, D. ARNOLD, *Examiners.*